(12) United States Patent
Osafune et al.

(10) Patent No.: US 11,987,772 B2
(45) Date of Patent: May 21, 2024

(54) SOLVENT COMPOSITION

(71) Applicant: CENTRAL GLASS COMPANY, LIMITED, Yamaguchi (JP)

(72) Inventors: Kanako Osafune, Saitama (JP); Fuyuhiko Sakyu, Saitama (JP); Michitaka Ootani, Saitama (JP)

(73) Assignee: CENTRAL GLASS COMPANY, LIMITED, Yamaguchi (JP)

( * ) Notice: Subject to any disclaimer, the term of this patent is extended or adjusted under 35 U.S.C. 154(b) by 768 days.

(21) Appl. No.: 17/149,208

(22) Filed: Jan. 14, 2021

(65) Prior Publication Data

US 2021/0238507 A1 Aug. 5, 2021

Related U.S. Application Data

(63) Continuation of application No. PCT/JP2019/029391, filed on Jul. 26, 2019.

(30) Foreign Application Priority Data

Jul. 27, 2018 (JP) ................................. 2018-141358

(51) Int. Cl.
| | | |
|---|---|---|
| *C11D 3/24* | (2006.01) | |
| *B05D 3/00* | (2006.01) | |
| *B08B 3/04* | (2006.01) | |
| *B08B 3/08* | (2006.01) | |
| *C07C 21/18* | (2006.01) | |
| *C08J 7/04* | (2020.01) | |
| *C09D 7/20* | (2018.01) | |
| *C09D 171/00* | (2006.01) | |
| *C11D 7/28* | (2006.01) | |
| *C11D 7/30* | (2006.01) | |
| *C11D 7/50* | (2006.01) | |
| *C11D 9/28* | (2006.01) | |

(52) U.S. Cl.
CPC ............ *C11D 7/5018* (2013.01); *B05D 3/007* (2013.01); *C08J 7/042* (2013.01); *C09D 7/20* (2018.01); *C09D 171/00* (2013.01); *C11D 7/30* (2013.01); *C08J 2333/04* (2013.01); *C08J 2355/02* (2013.01); *C08J 2369/00* (2013.01); *C08J 2471/00* (2013.01); *C11D 2111/18* (2024.01)

(58) Field of Classification Search
CPC .. C11D 3/24; C11D 3/245; C11D 7/28; C11D 7/30; C11D 7/5018; C11D 9/28; C07C 21/18; B08B 3/04; B08B 3/08
See application file for complete search history.

(56) References Cited

U.S. PATENT DOCUMENTS

| | | | |
|---|---|---|---|
| 2004/0202865 A1 | 10/2004 | Homola et al. | |
| 2005/0096246 A1 | 5/2005 | Johnson et al. | |
| 2015/0037505 A1 | 2/2015 | Tsuzaki et al. | |
| 2015/0353800 A1* | 12/2015 | Kujak | C09K 5/044 570/135 |
| 2018/0265821 A1* | 9/2018 | Imura | C11D 7/50 |
| 2018/0319726 A1 | 11/2018 | Mitsuoka et al. | |

FOREIGN PATENT DOCUMENTS

| | | | |
|---|---|---|---|
| JP | 02-221388 | 9/1990 | |
| JP | 02-221389 | 9/1990 | |
| JP | 02-221962 | 9/1990 | |
| JP | 02-222469 | 9/1990 | |
| JP | 02-222496 | 9/1990 | |
| JP | 02-222497 | 9/1990 | |
| JP | 02-222702 | 9/1990 | |
| JP | 4-198399 | 7/1992 | |
| JP | 2001-31996 | 2/2001 | |
| JP | 2001-31997 | 2/2001 | |
| JP | 2004-306030 | 11/2004 | |
| JP | 2016-141730 | 8/2016 | |
| WO | 2013/161723 | 10/2013 | |
| WO | 2016/125550 | 8/2016 | |
| WO | WO 2016/125550 | * 8/2016 | C11D 7/50 |
| WO | 2017/122801 | 7/2017 | |

OTHER PUBLICATIONS

International Search Report issued Sep. 10, 2019, in International (PCT) Application No. PCT/JP2019/029391.
Written Opinion issued Sep. 10, 2019, in International (PCT) Application No. PCT/JP2019/029391, with translation.
Office Action issued May 9, 2023 in Japanese Patent Application No. 2020-532497, with English language translation.
Office Action issued on Nov. 5, 2021 in Chinese Patent Application No. 201980036777.4 with translation.
International Search Report issued Sep. 10, 2019, in International (PCT) Application No. PCT/JP2019/023391.
Written Opinion issued 10, 2019, in International (PCT) Application No. PCT/JP2019/023391.
Office Action issued Jun. 10, 2021 in Chinese Patent Application No. 201980036777.4, with English-language translation.
Extended European Search Report issued Mar. 14, 2022 in corresponding European Patent Application No. 19841771.9.
Written Opinion issued Sep. 10, 2019, in International (PCT) Application No. PCT/JP2019/023391.

* cited by examiner

*Primary Examiner* — Brian P Mruk

(74) *Attorney, Agent, or Firm* — WENDEROTH, LIND & PONACK, L.L.P.

(57) ABSTRACT

One of the problems is to provide a solvent composition which has a little adverse effect on the global environment and has excellent stability when a compound having a perfluoropolyether (PFPE) group is in a solution state. In an embodiment, the problem is solved by providing a solvent composition for dissolving a compound having a perfluoropolyether (PFPE) group includes Z-1,2-dichloro-3,3,3-trifluoropropene (1223xd(Z)) as a main component.

9 Claims, No Drawings

SOLVENT COMPOSITION

CROSS REFERENCE TO RELATED APPLICATIONS

This application is based upon and claims the benefit of priority from the prior Japanese Patent Application No. 2018-141358, filed on Jul. 27, 2018, and PCT Application No. PCT/JP2019/029391, filed on Jul. 26, 2019, the entire contents of which are incorporated herein by reference.

FIELD

One of the embodiments of the present invention relates to a solvent composition for dissolving a composition containing a compound having a perfluoropolyether group (hereinafter, also referred to as "PFPE group") as a main component.

BACKGROUND

Compounds having PFPE group are generally thermally and chemically stable and has various characteristics such as excellent electrical insulation. For this reason, compounds having PFPE group are used in, for example, operating oils for vacuum pumps, lubricant, mold release agents for magnetic recording media and the like, and adhesives for optical member and the like, in the semiconductor industry.

The compounds having PFPE group are generally difficult to be dissolved other than in a fluorine-containing compound, and chlorofluorocarbons (hereinafter, also referred to as "CFCs"), hydrochlorofluorocarbons (hereinafter, also referred to as "HCFC"), perfluorocarbons (hereinafter, also referred to as "PFCs"), hydrofluorocarbons (hereinafter, also referred to as "HFCs") and the like have been used as a solvent used for preparing a lubricant solution containing a compound having PFPE group or as a cleaning agent for removing a compound having PFPE group from an article to which the compound is attached, from the viewpoint of excellent thermal and chemical stability. However, the use of CFCs and HCFC is restricted or banned in developed countries because of concerns about their adverse effects on the ozone-layer. PFCs and HFCs are specified as substances which are subject to control under the Kyoto Protocol because of their large global warming potential (GWP). Therefore, development of substances having a small impact on the global environment is required. Hydrochlorofluoroolefins and hydrofluoroolefins (hereinafter collectively referred to as "HFOs") and hydrofluoroethers (hereinafter also referred to as "HFEs") are attracting attention as substitutes for these.

As one of the HFOs, 1,1-dichloro-2,3,3,3-tetrafluoropropene (hereinafter, also referred to as "1214ya") or 1,2-dichloro-3,3,3-trifluoropropene (hereinafter, "1223xd") and the like are known (International patent publication No. WO2013/161723, Japanese laid-open patent publication No. 2016-141730, Japanese laid-open patent publication No. H02-221388, Japanese laid-open patent publication No. H02-221389, Japanese laid-open patent publication No. H02-221962, Japanese laid-open patent publication No. H02-222469, Japanese laid-open patent publication No. H02-222496, Japanese laid-open patent publication No. H02-222497, and Japanese laid-open patent publication No. H02-222702). However, the performance of HFOs for the compound having PFPE group has not been investigated so far.

SUMMARY

One of the problems of the present invention is to provide a solvent composition which has little adverse effect on the global environment and is excellent in stability when a compound having PFPE group is in a solution state.

The present inventors have intensively investigated to solve the above-mentioned problems. As a result, it has been found that a solvent composition containing Z-1,2-dichloro-3,3,3-trifluoropropene (hereinafter, also referred to as "1223xd(Z)") as a main component sufficiently dissolves a compound having PFPE group is and is excellent in dissolution stability in a solution state in which the compound having PFPE group is dissolved. Since 1223xd(Z) is included in fluoroolefins having a double bond in the molecule, the lifetime in the air is short, and the adverse effect on the global environment is small.

That is, one of the embodiments of the present invention is a solvent composition for dissolving a compound having a perfluoropolyether group, the solvent composition contains Z-1,2-dichloro-3,3,3-trifluoropropene as a main component. This solvent composition may contain E-1,2-dichloro-3,3,3-trifluoropropene. The solvent composition may contain an organic solvent selected from HFCs, HFEs, and HFOs. This solvent composition may contain a stabilizer, a flame retardant, a surfactant, a metal passivator or a rust-preventing agent.

One embodiment of the present invention is a solution containing the solvent composition and a compound having a perfluoropolyether group. This solution can be used as a solution for forming a coating film by applying the compound having the perfluoropolyether group to an article.

One embodiment of the present invention is a method of cleaning an article with a compound having a perfluoropolyether group attached using the solvent composition. A material of the article may be polycarbonate, acrylic resin or ABS resin.

One embodiment of the present invention is a method of forming a coating film, the method includes applying the solution to a surface of an article, volatilizing the solvent composition from the article, and forming the coating film containing the compound having the perfluoropolyether group on the surface of the article. The material of the article may be polycarbonate, acrylic resin or ABS resin.

DESCRIPTION OF EMBODIMENTS

Embodiments of the present invention will be described below. However, the present invention can be implemented in various modes without departing from the gist thereof and should not be construed as being limited to the description of the following exemplary embodiments. Further, even if the operation and effect are different from those provided by the following embodiments, those apparent from the description of the present specification or those which can be easily predicted by those skilled in the art are naturally understood to be brought by the present invention.

[1. Solvent Composition Containing 1223xd(Z) as a Main Component]

In this embodiment, a solvent composition for dissolving a compound having PFPE group, in which the solvent composition containing 1223xd(Z) as a main component (hereinafter, simply referred to as "present solvent composition") will be described.

(1223xd(Z))

In the present solvent composition, 50% by mass or more, preferably 50% by mass or more, more preferably 70% by mass or more, still more preferably 80% by mass or more, and particularly preferably 90% by mass or more of 1223xd(Z) is contained relative to the present solvent composition (100% by mass). The solvent composition may contain substantially only 1223xd(Z).

(1223xd(E))

In the present solvent composition, E-1,2-dichloro-3,3,3-trifluoropropene (hereinafter, also referred to as "1223xd(E)") may be contained. For example, 50% by mass or less, less than 50% by mass, 30% by mass or less, 20% by mass or less, or 10% by mass or less of 1223xd(E) may be contained relative to the present solvent composition (100% by mass). When 1223xd(E) is contained in the present solvent composition, solubility in the compound having PFPE group may be improved.

(Alternative Organic Solvent)

In the present solvent composition, an organic solvent other than 1223xd(Z) and 1223xd(E) (hereinafter, also referred to as "alternative organic solvent") may be contained. For example, the alternative organic solvent of 30% by mass or less, 20% by mass or less, or 10% by mass or less may be contained relative to the present solvent composition (100% by mass). Examples of the alternative organic solvent include HFCs, HFEs, and HFOs. These may be used alone, or 2 or more of them may be used in combination.

Examples of the HFCs include chain-like or cyclic hydrofluorocarbons having 4 or more and 8 or less carbon numbers, and among them, the number of fluorine atoms in 1 molecule may be equal to or more than the number of hydrogen atoms. Specific examples include, but are not limited to, 1,1,1,3,3-pentafluorobutane, 1,1,1,2,2,3,4,5,5,5-decafluoropentane, 1,1,2,2,3,3,4-heptafluorocyclopentane, 1,1,1,2,2,3,3,4,4-nonafluorohexane, 1,1,1,2,2,3,3,4,4,5,5,6,6-tridecafluorohexane, and 1,1,1,2,2,3,3,4,4,5,5,6,6-tridecafluorooctane.

Examples of the HFEs include a chain or cyclic hydrofluoroethers having 4 or more and 8 or less carbon numbers. Specific examples include, but are not limited to, $C_4F_9OCH_3$, $C_3F_7OCH_3$, 1,1,2,2-tellafluoroethoxy-1-(2,2,2-trifluoro)ethane (hereinafter also referred to as "HFE-347pc-f"), and the like.

Examples of the HFOs include hydrofluoroolefins or hydrochlorofluoroolefins having 3 or more and 6 or less carbon numbers. Specific examples thereof include, but are not limited to, 1,3,3,3-tetrafluoropropene, 2,3,3,3-tetrafluoropropene, and the like.

(Stabilizer)

A stabilizer may be contained in the present solvent composition. For example, thermal stability, oxidation resistance, and the like can be improved by containing a stabilizer. For example, the stabilizer may be contained 10% by mass or less, 3% by mass or less, 1% by mass or less, and 0.1% by mass or less in the solvent composition. Examples of this stabilizer include, but are not limited to, nitro compounds, epoxy compounds, phenols, imidazoles, amines, alcohols, unsaturated hydrocarbons, and the like. These may be used alone, or 2 or more of them may be used in combination.

Examples of the nitro compound include aliphatic nitro compounds and aromatic nitro compounds. Examples of the aliphatic nitro compounds include nitromethane, nitroethane, 1-nitropropane, and 2-nitropropane and the like. Examples of the aromatic nitro compounds include, for example, nitrobenzene, o-, m- or p-dinitrobenzene, trinitrobenzene, o-, m- or p-nitrotoluene, o-, m- or p-ethyl nitrobenzene, 2,3-, 2,4-, 2,5-, 2,6-, 3,4- or 3,5-dimethylnitrobenzene, o-, m- or p-nitroacetophenone, o-, m- or p-nitrophenol, o-, m- or p-nitroanisole and the like.

Examples of the epoxy compounds include monoepoxy-based compounds such as ethylene oxide, 1,2-butylene oxide, propylene oxide, styrene oxide, cyclohexene oxide, glycidol, epichlorohydrin, glycidyl methacrylate, phenylglycidyl ether, allyl glycidyl ether, methyl glycidyl ether, butyl glycidyl ether, and 2-ethylhexylglycidyl ether and the like, and polyepoxy-based compounds such as diepoxybutane, vinylcyclohexene dioxide, neopentyl glycol diglycidyl ether, ethylene glycol diglycidyl ether, glycerin polyglycidyl ether, and trimethylolpropane tolglycidyl ether and the like.

Examples of the phenols include, for example, aromatic compounds which may contain various substituents such as alkenyl group, alkenyl group, alkoxy group, carboxyl group, carbonyl group, and halogen and the like in addition to a phenolic hydroxyl group. Examples of such aromatic compounds include, for example, monovalent phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, xylenol or the like, or divalent phenols such as t-butylcatechol, 2,5-di-t-aminohydroquinone, 2,5-di-t-butyl-hydroquinone or the like.

Examples of the imidazoles include 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like, in which 1 or more and 18 or less carbon numbers of alkyl group, cycloalkyl group, or aryl group are used as a substituent at the N-position.

Examples of the amines include pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine, dipropylamine, butylamine, isobutylamine, dibutylamine, tributylamine, dipenethylamine, tripenethylamine, 2-ethylhexylamine, aniline, N,N-dimethylaniline, N,N-diethylaniline, ethylenediamine, propylenediamine, diethylenetriamine, tetraethylenepentamine, benzylamine, dibenzylamine, diphenylamine, diethylhydroxylamine, and the like.

Examples of the alcohols include methanol, ethanol, 1-propanol, 2-propanol, 1-butanol, 2-butanol, and 2-methyl-2-propanol.

Examples of the unsaturated hydrocarbons include α-methylstyrene, p-isopropenyltoluene, isoprenes, propadienes, and terpenes.

(Flame Retardant)

A flame retardant may be contained in the present solvent composition. Flame retardancy can be improved by containing the flame retardant. For example, the flame retardant may be contained 5% by mass or less, 3% by mass or less, 1% by mass or less, and 0.1% by mass or less in the solvent composition. Such flame retardant includes, but is not limited to, phosphates, halogenated aromatic compounds, fluorination iodo carbon, fluorinated bromocarbon, and the like.

(Surfactant)

A surfactant may be contained in the present solvent composition. For example, detergency, interfacial action, and the like can be improved by containing the surfactant. For example, the surfactant may be contained 5% by mass or less, 3% by mass or less, 1% by mass or less, and 0.1% by mass in the solvent composition. Examples of the surfactants include nonionic surfactants such as sorbitan aliphatic esters such as sorbitan monooleate and sorbitan trioleate; polyoxyethylene sorbitol fatty acid esters such as sorbitan tetraoleate of polyoxyethylene; polyethylene glycol fatty acid esters such as polyoxyethylene monolaurate; polyoxyethylene alkyl ethers such as polyoxyethylene lauryl ether; polyoxyethylene alkyl phenyl ethers such as polyoxyethylene nonylphenyl ether; polyoxyethylene alkylamine fatty acid amides such as polyoxyethylene oleic acid amide, and the like.

(Metal Passivator)

A metal passivator may be contained in the present solvent composition. For example, the metal passivator may be contained 5% by mass or less, 3% by mass or less, 1% by mass or less, and 0.1% by mass or less in the solvent composition. Examples of the metal passivator include, for example, benzotriazole and its derivatives, alkylbezotriazole and its derivatives, 1,2,4-triazole and its derivatives, and sulfur-containing heterocyclic compounds, and the like.

(Rust-Preventing Agent)

A rust-preventing agent may be contained in the present solvent composition. For example, the rust-preventing agent may be contained 5% by mass or less, 3% by mass or less, 1% by mass or less, and 0.1% by mass or less in the solvent composition.

(Embodiment of Solvent Composition)

Specific composition of the present solvent composition is exemplified below, but the present solvent composition is not limited thereto. The following "auxiliary agent" refers to a generic term of a stabilizer, a flame retardant, a surfactant, a metal passivator, and a rust-preventing agent, and the content of the auxiliary agent in the present solvent composition refers to the sum of these 1 or 2 or more components.

Relative to the present solvent composition (100% by mass), a composition containing 70% by mass or more of 1223xd(Z) and 30% by mass or less of 1223xd(E) or the alternative organic solvent; a composition containing 70% by mass or more of 1223xd(Z), 25% by mass or less of 1223xd(E) or the alternative organic solvent, and 5% by mass or less of the auxiliary agent; a composition containing 70% by mass or more of 1223xd(Z) and 20% by mass or less of 1223xd(E) or the alternative organic solvents, and 10% by mass or less of the auxiliary agent;

a composition containing 80% by mass or more of 1223xd(Z) and 20% by mass or less of 1223xd(E) or the alternative organic solvent; a composition containing 80% by mass or more of 1223xd(Z), 15% by mass or less of 1223xd(E) or the alternative organic solvent, and 5% by mass or less of auxiliary agents; and a composition containing 80% by mass or more of 1223xd(Z) and 10% by mass or less of 1223xd(E) or the alternative organic solvent, and 10% by mass or less of the auxiliary agent;

a composition containing 85% by mass or more of 1223xd(Z) and 15% by mass or less of 1223xd(E) or the alternative organic solvent; a composition containing 85% by mass or more of 1223xd(Z), 10% by mass or less of 1223xd(E) or the alternative organic solvent, and 5% by mass or less of the auxiliary agent; a composition containing 85% by mass or more of 1223xd(Z) and 5% by mass or less of 1223xd(E) or the alternative organic solvent, and 10% by mass or less of the auxiliary agent;

a composition containing 90% by mass or more of 1223xd(Z); a composition containing 90% by mass or more of 1223xd(Z) and 10% by mass or less of 1223xd(E) or the alternative organic solvent; a composition containing 90% by mass or more of 1223xd(Z) and 5% by mass or less of 1223xd(E) or the alternative organic solvent, and 5% by mass or less of the auxiliary agent; and a composition containing 95% by mass or more of 1223xd(Z); a composition containing 95% by mass or more of 1223xd(Z) and 5% by mass or less of 1223xd(E) or the alternative organic solvent; and a composition containing 95% by mass or more of 1223xd(Z) and 5% by mass or less of the auxiliary agent.

(Compound Having PFPE Group)

In the present specification, the compound having PFPE group is a compound having repeating units (oxyperfluoroalkylene group) represented by —$C_aF_{2a}O$— (a is an integer of 1 or more and 6 or less), preferably at least one repeating unit selected from a group consisting of —$C_4F_8O$—, —$C_3F_6O$—, —$C_2F_4O$— and —$CF_2O$—. The compound having PFPE group to be dissolved in the present solvent composition is not particularly limited as long as it is a compound having PFPE group, but a compound in which PFPE group occupies a main portion of the entire compound, that is, a compound in which PFPE group occupies 50% or more, 60% or more, 70% or more, 80% or more, or 90% or more of the molecular weight of the compound having PFPE group is preferred. The compound having PFPE group may have a carboxyl group, a hydroxy group, an amide group, a carbonyl group, an amino group or an alkoxy group. The compound having PFPE group may be a compound substantially consisting of PFPE group, that is, it may be substantially perfluoropolyether.

Examples of the compound having PFPE group include, but are not limited to, the following compounds (a) to (d).

(a) A compound having an average molecular weight of 1300 or more and 8000 or less and represented by general formula (1), (b) A compound having an average molecular weight of 3200 or more and 23000 or less and represented by general formula (2), (c) A compound having an average molecular weight of 2000 or more and 11000 or less and represented by general formula (3), and (d) A compound having an average molecular weight of 1000 or more and 20000 or less and represented by general formula (4).

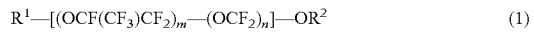

$$R^1—[(OCF(CF_3)CF_2)_m—(OCF_2)_n]—OR^2 \quad (1)$$

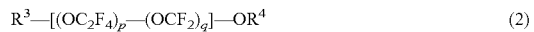

$$R^3—[(OC_2F_4)_p—(OCF_2)_q]—OR^4 \quad (2)$$

$$F—(C_3F_6O)_r—R^5 \quad (3)$$

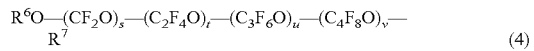

$$R^6O—(CF_2O)_s—(C_2F_4O)_t—(C_3F_6O)_u—(C_4F_8O)_v—R^7 \quad (4)$$

In the formulae, m and n are integers of 1 or more, satisfy m+n=8 or more and 120 or less, $R^1$ and $R^2$ are independently perfluoroalkyl groups having 1 or more and 4 or less carbon numbers, p and q are integers of 1 or more, satisfy p+q=25 or more and 350 or less, $R^3$ and $R^4$ are independently perfluoroalkyl groups having 1 or more and 4 or less carbon numbers, r is an integer of 10 or more and 80 or less, $R^5$ is a perfluoroalkyl group having 1 or more and 4 or less carbon numbers, s, t, u and v are integers of 1 or more, satisfy t/s=2 or more and 5 or less, (u+v)/(s+t+u+v)=0.07 or more and 0.2 or less, s/(s+t+u+v)=0.1 or more and 0.3 or less, $R^6$ and $R^7$ are independently perfluoroalkyl groups having 1 or more and 4 or less carbon numbers.

In addition, examples of the compound having PFPE group to be dissolved in the present solvent composition include a perfluoropolyether-modified alkyloxysilane polymer.

Examples of the compound having PFPE group to be dissolved in the present solvent composition include, but are not limited to, the following products:

Fomblin (registered trademark) Y series manufactured by Solvay Specialty Polymer Co., Ltd., Fomblin (registered trademark) M series, Fomblin (registered trademark) W series, Fomblin (registered trademark) Z series; DEMNUM (registered trademark) series manufactured by Daikin Industries, Ltd.; Krytox (registered trademark) series manufactured by DuPont Co., Ltd.

A perfluoropolyether-containing fluorine-based lubricant may contain an additive (e.g., a rust-preventing agent) together with the perfluoropolyether or may be used mixed with a fluorine-based solid lubricant such as a polytetrafluoroethylene resin powder. The present solvent composition dissolves the compound having PFPE group and is also useful when such a component is present. Thus, compounds having PFPE group herein may also include compositions containing such components together with the perfluoropolyether.

[2. Solution in which a Compound Having PFPE Group is Dissolved in the Solvent Composition]

The present solvent composition can make a solution of the compound having PFPE group (hereinafter, also referred to as "solution for coating") by dissolving the compound having PFPE group. By applying this solution for coating to the surface of an article and then volatilizing the present solvent composition from the article, it is possible to manufacture an article with a coating film on which a coating film containing the compound having PFPE group on the surface of the article is formed. For example, a coating solution can be applied to the article by a method such as coating with a brush, coating by spraying, coating by dipping the article in the solution for coating, and contacting the solution for coating on an inner wall of a tube or an injection needle by sucking up the solution for coating, and then the present solvent composition is volatilized by drying to form the coating film on the surface of the article.

Although HFOs and HFEs are expected as substitutes for CFCs, for example, 1214ya, a kind of HFOs, may be degraded and acidified in use in the air due to their poor stability in the air. 1,1,2,2-tetrafluoroethyl-2,2,2-trifluoroethyl ether (347pc-f), a kind of HFEs, is not always good stability in dissolution with PFPE, as also shown in the example described later. On the other hand, the present solvent composition shows good solubility in the compound having PFPE group. Since the present solvent composition contains 1223xd(Z), which has a short life in the air, as a main component, it has little adverse effect on the global environment.

A solution in which the compound having PFPE group is dissolved in the present solvent composition shows uniformity not only immediately after dissolution but also over a long period of time (e.g., 3 days or more, 10 days or more), and is excellent in stability (dissolution stability) in a solution state. Therefore, it is possible to stably supply as a solution (solution for coating) for forming a coating film containing the compound having PFPE group on the surface of the article. When the present solvent composition is used as a cleaning agent, when the compound having PFPE group is removed from the article, a solution of the compound having PFPE group and the present solvent composition (hereinafter, also referred to as a "solution after a cleaning step") is formed. For recycling of the present solvent composition, the solution after the cleaning step is recovered and then subjected to a purification operation such as distillation, and the present solvent composition is recovered. Since this recycling is performed separately from the cleaning step in a general method, it may take a long time from the recovery to the purification operation. During this time, since the compound having PFPE group and the present solvent composition show uniformity in the solution after the present cleaning step, the compound having PFPE group is less likely to be adhered to the recovery container or hindered from purification, thereby enabling efficient recycling of the present solvent composition.

[3. Cleaning Method of Article]

A cleaning method of an article using the present solvent composition is not particularly limited except that the present solvent composition is used for the article to which the compound having PFPE group is attached. By contacting the present solvent composition with the article to which the compound having PFPE group is attached, the compound having PFPE group can be removed from the article. This contact may include, but is not limited to, hand wiping, immersion cleaning, spray cleaning, immersion rocking cleaning, immersion ultrasonic cleaning, boiling cleaning, steam cleaning, combinations thereof, and the like.

Examples of this article include metals, resins, rubbers, fibers, glass, ceramics, and those made of a composite material thereof. Examples of the composite material include a laminated body of a metal and a resin. The article includes, but is not limited to, a precision mechanical component, an electronic material (such as a print substrate, a liquid crystal display, a magnetic recording component, a semiconductor material, etc.), a resinous processed component, an optical lens, a textile, a medical instrument, and the like. As also shown in the examples described later, since the present solvent composition has little adverse effect on various resins such as PC (polycarbonate), acrylic resin, and ABS resin, it is particularly effective in an embodiment in which such a resin is used as a material of the article.

EXAMPLES

Hereinafter, an embodiment according to the present invention will be described in detail by examples, but the embodiment of the present invention is not limited to the examples.

In this example, any of the following PFPE1 to PFPE3 was used as a compound having PFPE group (hereinafter, simply referred to as "PFPE").

PFPE1: a polymer having a structural formula represented by $CF_3—[(OCF(CF_3)CF_2)_m—(OCF_2)_n]—OCF_3$ (average molecular weight 3300)

PFPE2: a polymer having a structural formula represented by $CF_3—[(OC_2F_4)_p—(OCF_2)_q]—OCF_3$ (average molecular weight 9700)

PFPE3: a polymer having a structural formula represented by $F—(C_3F_6O)_m—C_2F_5$ (average molecular weight 4500)

In the formulae, m and n are integers of 1 or more, satisfy m+n=8 or more and 120 or less, p and q are integers of 1 or more, and satisfy p+q=25 or more and 350 or less.

[Examples 1 to 6, 20, Comparative Examples 1 to 6, 10] Dissolution Stability Test of PFPE Solutions 50 ml glass screw-tube bottles were charged with 28.5 g of the solvents shown in Table 1. Next, 1.5 g of PFPEs shown in Table 1 were put into the screw-tube bottles, and these were thoroughly mixed to obtain uniform solutions. These were stored under light shielding at room temperature, and each condition of the solution after 0 days (immediately after mixing PFPEs and the solvents), 3 days, and 10 days was visually observed. The condition in which the solution was colorless and transparent (no turbidity) was evaluated as "o", and the condition in which slight turbidity occurred was evaluated as "A", and the condition in which obvious coloration, generating of gelation or two layers separation occurred was evaluated as "x" The results are shown in Table 1.

TABLE 1

| Examples | Solvent | PFPE | Visual condition | | |
|---|---|---|---|---|---|
| | | | 0 days after | 3 days after | 10 days after |
| Example 1 | 1223xd(Z) | PFPE1 | o | o | o |
| Example 2 | 1223xd(Z) | PFPE2 | o | o | o |
| Example 3 | 1223xd(Z) | PFPE3 | o | o | o |
| Example 4 | 1223xd(Z) (Z-body 90%, E-body 10%) | PFPE1 | o | o | o |
| Example 5 | 1223xd(Z) (Z-body 90%, E-body 10%) | PFPE2 | o | o | o |
| Example 6 | 1223xd(Z) (Z-body 90%, E-body 10%) | PFPE3 | o | o | o |
| Example 20 | 1223xd(Z) 50% 1233zd(Z) 50% | PFPE1 | o | o | o |
| Comparative Example 1 | 1233zd(Z) | PFPE1 | x | x | x |
| Comparative Example 2 | 1233zd(Z) | PFPE2 | x | x | x |
| Comparative Example 3 | 1233zd(Z) | PFPE3 | x | x | x |
| Comparative Example 4 | 347pc-f | PFPE1 | x | x | x |
| Comparative Example 5 | 347pc-f | PFPE2 | x | x | x |
| Comparative Example 6 | 347pc-f | PFPE3 | x | x | x |
| Comparative Example 10 | 1223xd(Z) 25% 1233zd(Z) 75% | PFPE1 | x | x | x |

In Table 1, 1233zd(Z) means (Z)1-chloro-3,3,3-trifluoropropene.

As shown in Table 1, when 1223xd(Z) was contained in an amount of 50% by mass or more as the solvent, and when 1223xd(Z) alone, 1223xd(Z) 50% by mass and 1233zd(Z) 50% by mass of solvent, and 1223xd(Z) 90% by mass and 1223xd(E) 10% by mass of solvent were used, the conditions of the solution after 3 days and 10 days were colorless and transparent. On the other hand, when 1233zd(Z), which is one of the HFOs, or 347pc-f, which is one of the HFEs, was used alone or when 1223xd(Z) was contained in an amount of less than 50% by mass, it was separated in two layers immediately after mixing with PFPE.

As also shown in Table 1, not all of the fluorine-containing compounds are capable of dissolving the compound having PFPE group. Generally, it is believed that a solvent having a higher proportion of fluorine atoms in a compound dissolves the compound having PFPE group. However, as shown in Table 1, when 347pc-f having a higher proportion of fluorine atoms in the compound was used, PFPE1 to PFPE3 could not be dissolved, whereas when 1223xd having a lower proportion of fluorine atoms in the compound was used, PFPE1 to PFPE3 could be dissolved.

[Examples 7 to 8, Comparative Example 7] Storage Stability Test 80 g of the solvents shown in Table 2 were put into a 100 mL screw vial bottles and allowed to stand at room temperature for 10 days. After standing for 10 days, 50 g of the solvents were collected from the screw vial bottles, and 50 g of neutrally prepared water was added and mixed thoroughly. Thereafter, the mixture was allowed to stand and separated in two layers, and pH measurement of the water layer was performed using a pH meter (pH meter MM-60R manufactured by DKK-TOA CORPORATION). The case where there is no change in the pH before and after the test was evaluated as "o", and the case where the pH was lowered to 4 or less was evaluated as "x". The test results are shown in Table 2.

TABLE 2

| Examples | Solvent | Stability evaluation |
|---|---|---|
| Example 7 | 1223xd(Z) | o |
| Example 8 | 1223xd(Z-body 90%, E-body 10%) | o |
| Comparative Example 7 | 1214ya | x |

[Examples 9 to 10, Comparative Example 8] Material Compatibility Test

The solvent 20 g shown in Table 3 and one test piece of an ABS resin (30 mm×15 mm×2 mm) were put into a 30 ml screw vial bottles so that the test piece was completely immersed in the solvent, and kept at the solvent temperature of 40° C. for 1 hour. Thereafter, the test piece was removed and allowed to dry naturally. The condition of the test piece after drying was visually confirmed. The test piece having the dimensions and the surface which do not change before immersion was evaluated as "o", and the test piece having the dimensions and the appearance which clearly changed was evaluated as "x". The results are shown in Table 3.

TABLE 3

| Examples | Solvent | ABS resin |
|---|---|---|
| Example 9 | 1223xd(Z) | o |
| Example 10 | 1223xd(Z-body 90%, E-body 10%) | o |
| Comparative Example 8 | 1233zd(Z) | x |

[Example 11, Comparative Example 9] Material Compatibility Test 20 g of the solvent shown in Table 4 and one test piece of PC (polycarbonate), acrylic resin, or the ABS resin (30 mm×15 mm×2 mm) were respectively put into the 30 ml screw vial bottle so that the test piece was completely immersed in the solvent, and kept at the solvent temperature of 5° C. for 5 minutes. Thereafter, the test piece was removed and allowed to dry naturally. The condition of the test piece after drying was visually confirmed. The test piece having the dimensions and the surface which do not change before immersion was evaluated as "o", and the test piece having the dimensions and the appearance which clearly changed was evaluated as "x". The results are shown in Table 4.

TABLE 4

| | Solvent | PC | Acrylic resin | ABS resin |
|---|---|---|---|---|
| Example 11 | 1223xd(Z) | ○ | ○ | ○ |
| Comparative Example 9 | 1233zd(Z) | × | × | × |

[Examples 12 to 17] Test for Evaluation of Coating Property and Drying Property

PFPE and the solvent shown in Table 5 were mixed to prepare 0.5% by mass PFPE solution. This PFPE solution was applied onto a test piece made of SUS316, and a PFPE coating film was formed on a surface of the test piece made of SUS316 by air-drying the solvent. The condition of the obtained coating film was visually confirmed. Those in which no unevenness was observed in the coating film were evaluated as having "good" coating property. In addition, those in which the solvent was immediately evaporated at the time of forming the PFPE coating film were evaluated as having "good" drying property. The results are shown in Table 5.

TABLE 5

| Examples | Solvent | PFPE | Coating property | Drying property |
|---|---|---|---|---|
| Example 12 | 1223xd(Z) | PFPE 1 | Good | Good |
| Example 13 | 1233xd(Z) | PFPE 2 | Good | Good |
| Example 14 | 1223xd(Z) | PFPE 3 | Good | Good |
| Example 15 | 1223xd(Z-body 90%, E-body 10%) | PFPE 1 | Good | Good |
| Example 16 | 1223xd(Z-body 90%, E-body 10%) | PFPE 2 | Good | Good |
| Example 17 | 1223xd(Z-body 90%, E-body 10%) | PFPE 3 | Good | Good |

[Example 18] Cleaning Test 200 g of PFPE (Fomblin (registered trademark) Y LVAC 25/6E, manufactured by Solvay Specialty Polymer Co., Ltd.,) was put into a 300 ml glass beaker. Next, one test piece made of SUS316 (30 mm×15 mm×2 mm) was completely immersed in PFPE. When the test piece was removed from PFPE and visually confirmed, PFPE adhered to the surface of the test piece. Subsequently, 200 g of 1223xd(Z) was put into a 500 mL glass beaker, the SUS test piece with PFPE attached was completely immersed in the solvent, and subjected to ultrasonic cleaning (ultrasonic oscillator: neosonic made by Alex Corporation, power 100 W, frequency 28 kHz) for 2 minutes at 25° C. Thereafter, the test piece was removed and dried for 5 minutes at 80° C., and then the surface of the test piece was visually observed, and no stain was confirmed on the surface of the test piece. This showed a good PFPE detergent property of 1223xd(Z).

Example 19

The same operation as in Example 18 was performed except that 1223xd (Z-body 90% by mass and E-body 10% by mass) was used instead of 1223xd(Z). As a result, no stain was confirmed on the surface of the test piece after cleaning and drying. This showed good PFPE detergent property of 1223xd (Z-body 90% by mass and E-body 10% by mass).

According to the embodiment of the present invention, it is possible to provide a solvent composition which has little adverse effect on the global environment and is excellent in stability in a solution state of a compound having PFPE group.

What is claimed is:

1. A solvent composition for dissolving a compound having a perfluoropolyether group, comprising: Z-1,2-dichloro-3,3,3-trifluoropropene as a main component, wherein the compound having a perfluoropolyether group is a compound represented by formula (1) with a weight average molecular weight of 1300 or more and 8000 or less, a compound represented by formula (2) with a weight average molecular weight of 3200 or more and 23000 or less, a compound represented by formula (3) with a weight average molecular weight of 2000 or more and 11000 or less, or a compound represented by formula (4) with a weight average molecular weight of 1000 or more and 20000 or less:

$$R^1-[(OCF(CF_3)CF_2)_m-(OCF_2)_n]-OR^2 \quad (1)$$

$$R^3-[(OC_2F_4)_p-(OCF_2)_q]-OR^4 \quad (2)$$

$$F-(C_3F_6O)_r-R^5 \quad (3)$$

$$R^6O-(CF_2O)_s-(C_2F_4O)_t-(C_3F_6O)_u-(C_4F_8O)_v-R^7 \quad (4)$$

wherein, in the formula (1), m and n are integers of 1 or more, m+n=8 or more and 120 or less, and $R^1$ and $R^2$ are independently perfluoroalkyl groups having 1 or more and 4 or less carbon numbers, wherein, in the formula (2), p and q are integers of 1 or more, p+q=25 or more and 350 or less, and $R^3$ and $R^4$ are independently perfluoroalkyl groups having 1 or more and 4 or less carbon numbers, wherein, in formula (3), r is an integer of 10 or more and 80 or less, and $R^5$ is a perfluoroalkyl group having 1 or more and 4 or less carbon numbers, and wherein, in formula (4), s, t, u, and v are integers of 1 or more, t/s=2 or more and 5 or less, (u+v)/(s+t+u+v) =0.07 or more and 0.2 or less, s/(s+t+u+v)=0.1 or more and 0.3 or less, and $R^6$ and $R^7$ are independently perfluoroalkyl groups having 1 or more and 4 or less carbon numbers.

2. The solvent composition according to claim 1, further comprising: E-1,2-dichloro-3,3,3-trifluoropropene.

3. The solvent composition according to claim 1, further comprising: at least one organic solvent selected from the group consisting of a hydrofluorocarbon, a hydrofluoroether, and a hydrofluoroolefin.

4. The solvent composition according to claim 1, further comprising: at least one selected from the group consisting of a stabilizer, a flame retardant, a surfactant, a metal passivator, and a rust-preventing agent.

5. A solution comprising: the solvent composition according to claim 1, and a compound having a perfluoropolyether group.

6. A method for cleaning an article with a compound having a perfluoropolyether group attached with the solvent composition according to claim 1, the method comprising:
contacting the solvent composition with the article to which the compound having the perfluoropolyether group is attached, and removing the compound having perfluoropolyether group from the article.

7. The method according to claim 6, wherein the article is comprises a material selected from the group consisting of polycarbonate, acrylic resin, and ABS resin.

8. A method of forming a coating film, comprising: coating the solution according to claim 5 to a surface of an article; volatilizing the solvent composition from the article; and forming the coating film including the compound having the perfluoropolyether group on the surface of the article.

9. The method according to claim 8, wherein the article comprises a material selected from the group consisting of polycarbonate, acrylic resin or ABS resin.

\* \* \* \* \*